(12) United States Patent
Shahmohammadian et al.

(10) Patent No.: US 10,135,661 B2
(45) Date of Patent: Nov. 20, 2018

(54) PHASE NOISE ESTIMATION AND CANCELLATION

(71) Applicants: Hoda Shahmohammadian, Ottawa (CA); Ahikam Aharony, Ottawa (CA)

(72) Inventors: Hoda Shahmohammadian, Ottawa (CA); Ahikam Aharony, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/423,108

(22) Filed: Feb. 2, 2017

(65) Prior Publication Data

US 2017/0373910 A1    Dec. 28, 2017

Related U.S. Application Data

(60) Provisional application No. 62/353,199, filed on Jun. 22, 2016.

(51) Int. Cl.
*H04L 27/26* (2006.01)
*H04L 5/00* (2006.01)
(Continued)

(52) U.S. Cl.
CPC .......... *H04L 27/2688* (2013.01); *H04L 5/006* (2013.01); *H04L 5/0048* (2013.01);
(Continued)

(58) Field of Classification Search
CPC ..... H04N 5/455; H04L 27/066; H04L 1/0054; H04L 1/0057; H04L 1/006; H04L 1/0036;
(Continued)

(56) References Cited

U.S. PATENT DOCUMENTS

| 6,819,630 | B1 * | 11/2004 | Blackmon | .............. | H04B 11/00 367/134 |
| 2003/0151692 | A1 * | 8/2003 | Hauge | .................... | H04N 5/455 348/607 |

(Continued)

FOREIGN PATENT DOCUMENTS

| CN | 1302125 A | 7/2001 |
| CN | 103348622 A | 10/2013 |
| CN | 104769900 A | 7/2015 |

OTHER PUBLICATIONS

Tzvika Naveh, Mobile Backhaul: Fiber Vs. Microwave, Case Study Analyzing Various Backhaul Technology Startegies, Ceragon, Oct. 2009, pp. 1-11.

(Continued)

*Primary Examiner* — Vineeta Panwalkar (57) ABSTRACT

Phase noise estimation and cancellation as disclosed herein may allow cost-efficient increase of capacity in communications by enabling very high QAM levels. The proposed solution is potentially applicable to any single carrier applications where phase noise is a limiting factor and a required order of modulation is very high. For example, disclosed embodiments may enable high QAM levels for microwave backhauls despite severe phase noise sensitivity. One embodiment involves a pilot-aided and BCJR-based sequential search algorithm that accurately estimates and subtracts fast-varying phase noise symbol-by-symbol. Residual BER performance is evaluated under the most challenging phase noise scenarios. FPGA emulation results show detection and removal of a significant amount of phase noise and zero BER performance even for complex 1K-QAM and above.

23 Claims, 8 Drawing Sheets

(51) Int. Cl.
*H04L 27/34* (2006.01)
*H04L 25/02* (2006.01)
*H04L 1/00* (2006.01)

(52) U.S. Cl.
CPC .......... *H04L 25/0226* (2013.01); *H04L 27/34* (2013.01); *H04L 1/006* (2013.01)

(58) Field of Classification Search
CPC .................. H04L 1/0041; H04L 1/0045; H04L 2027/0067; H04L 27/2688; H04L 27/34; H04L 5/006; H04L 5/0048
See application file for complete search history.

(56) References Cited

U.S. PATENT DOCUMENTS

| | | | |
|---|---|---|---|
| 2005/0204208 A1* | 9/2005 | Kocic | H04L 25/0216 714/700 |
| 2006/0062284 A1 | 3/2006 | Li et al. | |
| 2006/0085727 A1* | 4/2006 | Azenkot | H04L 5/02 714/792 |
| 2013/0202022 A1 | 8/2013 | Cai | |
| 2014/0112379 A1 | 4/2014 | Biyani et al. | |
| 2014/0211889 A1 | 7/2014 | Arambepola et al. | |
| 2015/0280951 A1* | 10/2015 | Shin | H04L 27/14 375/334 |

OTHER PUBLICATIONS

Ericsson, Microwave Towards 2020, Delivering High-Capacity and Cost-Efficient Backhaul for Broadband Networks Today and in the Future, Sep. 2015, pp. 1-16, Sweden.

International Telecommunication Union, ITU-R, Radio-Frequency Arrangements for Fixed Service Systems, Sep. 2007, 19 pages, Switzerland.

Volker Simon et. al., Phase Noise Estimation via Adapted Interpolation, Institute for Integrated Signal Processing Systems (ISS) IEEE, 2001, pp. 3297-3301, Germany.

Gianluigi Ferrari et. al., On Linear Predictive Detection for Communications with Phase Noise and Frequency Offset, IEEE Transactions on Vehicular Technology, vol. 56, No. 4, Jul. 2007, pp. 2073-2085.

M. Martalo, Reduced-Complexity Synchronization for High-Order Coded Modulations, IEEE Signal Processing for Communications Symposium, 2015, pp. 1-6.

John G. Proakis, Digital Communications, 2000, 14 pages.

* cited by examiner

PHASE NOISE ESTIMATION AND CANCELLATION

CROSS-REFERENCE TO RELATED APPLICATION

The present application claims the benefit of U.S. Provisional Application Ser. No. 62/353,199, entitled "PHASE NOISE ESTIMATION AND CANCELLATION", filed on Jun. 22, 2016, the entire contents of which are incorporated herein by reference.

FIELD

The present application relates to wireless communications generally and, in particular embodiments, to estimation and cancellation of phase noise.

BACKGROUND

Microwave transmission is a predominant technology in telecommunication networks. As capacity requirements for mobile networks rise, there are ongoing efforts to improve spectral efficiency of microwave backhaul links over limited allocated bandwidths. Moving toward higher order modulation is a cost-efficient solution to increase capacity in bandwidth-limited channels.

SUMMARY

Pilot symbols are interleaved with communication symbols in a received symbol stream. The phase noise affecting a current symbol is estimated by performing a single-pass trellis-based estimation. The trellis-based estimated phase noise is then cancelled from the current symbol.

In an embodiment, the trellis-based estimation is used to estimate residual phase noise after pilot symbol assisted phase noise estimation and cancellation. A first pilot-assisted phase noise estimate could be determined based on a first pilot symbol that precedes the current symbol, and a second pilot-assisted phase noise estimate could similarly be determined based on a second pilot symbol that follows the current symbol. An interpolation between at least the first and second pilot-assisted phase noise estimates may be used to calculate an interpolated phase noise estimate for the current symbol, and the interpolated phase noise estimate is then cancelled from the current symbol.

Other aspects and features of embodiments of the present disclosure will become apparent to those ordinarily skilled in the art upon review of the following description.

BRIEF DESCRIPTION OF THE DRAWINGS

Embodiments will be described in greater detail with reference to the accompanying drawings.

DETAILED DESCRIPTION

As noted above, moving toward higher order modulation is a cost-efficient solution to increase capacity in bandwidth-limited channels. Complex higher order modulations may be practical if a well-defined, high performance, carrier synchronization algorithm is provided to detect and remove phase noise from a desired signal. The importance of such a precise carrier recovery algorithm is stressed with the transition from legacy, GaAs Voltage-Controlled Oscillator (VCO) frequency sources, to integrated, low-cost Complementary Metal Oxide Semiconductor (CMOS) based VCOs that suffer from a significantly elevated phase noise level.

The present application discloses carrier synchronization methods and apparatus that handle phase noise and may allow complicated extremely high Quadrature Amplitude Modulation (QAM) at an acceptable complexity level. In an embodiment, carrier synchronization is pilot-aided and employs a Bahl-Cocke-Jelinek-Raviv (BCJR)-based sequence estimator to detect fast-varying phase noise, symbol-by-symbol, for complex modulation orders as high as 4K-QAM.

The relative scarcity of free microwave spectrum and higher demand for capacity imposed by the introduction of Long Term Evolution (LTE) and fifth generation (5G) mobile networks drives microwave systems such as microwave backhaul networks toward ever increasing spectral efficiency.

Mobile backhaul technologies are generally categorized into wired transmission (including copper and fiber) and wireless transmission. Wireless backhaul is accomplished at microwave radio band through a Line Of Sight (LOS) and point-to-point communication link. To date, microwave transmission is the only form of wireless communication that can provide both the range and throughput requirements needed for backhaul of LTE and 5G cellular networks.

The microwave backhaul spectrum consists of more than 10 GHz of allocated bandwidth that spans from 6 GHz to 42 GHz and provides higher bandwidth compared to all sub-6GHz frequencies. In addition, at microwave frequencies, highly directed narrow beams can be achieved using a size of antenna that can be conveniently made. This means that the same frequencies can be reused by several nearby installations of microwave equipment without interference.

Table I below summarizes some specification differences between two competitive backhaul technologies: fiber and microwave transmission (See T. Naveh, "Mobile Backhaul: Fiber vs. Microwave", Ceragon white paper, October 2009).

Fiber backhaul has almost no limitation for capacity and is able to support rapid growth of bandwidth demands. However, in addition to capacity, there are several other factors (such as cost, reach, deployment time, need for frequency spectrum, wiring and rights of way) that affect fiber-versus-microwave decisions. To date, microwave transmission has been the mainstream candidate for mobile backhaul.

TABLE I

Specifications of Microwave and Fiber Backhauls

| Specifications | Microwave | Fiber |
| --- | --- | --- |
| Capacity | Gbps | practically unlimited |
| Cost | per link | per hop length |
| Deployment time | fast | slow, unpredictable |
| Climate | sensitive | mostly not affected |
| Regulation | spectrum regulation | right of ways and infrastructure |
| Terrain | suitable for almost any terrain | cost increases for difficult terrain |
| Reuse | can be removed and relocated | impossible in most cases |

Bandwidths allocated to microwave transmission are limited, ranging from a few MHz to a maximum of a few hundred MHz. Faced with fast-growing demands for higher capacities and download speeds but limited bandwidths, development continues on microwave backhauls, to constantly and efficiently improve spectrum usage of current available spectrum. One option for increasing spectral efficiency is moving toward higher-order modulations. To enable higher order QAMs, a well-defined carrier recovery algorithm may be useful in dealing with phase noise limitations and challenges, especially with replacement of GaAs based VCO frequency sources by low-cost integrated CMOS based VCO frequency sources that have elevated phase noise levels.

A number of research studies have focused on studying challenges in communication channels impaired by phase noise. However, none of these works provides accurate enough phase noise estimation that allows complex modulation levels of 1K-QAM and above. In V. Simon, A. Senst, M. Speth, and H. Meyr, "Phase noise estimation via adapted interpolation," Global Telecommunications Conference 2001, vol. 6, Nov. 25-29, 2001, pp. 3297-3301, a pilot-aided adapted interpolation is used to estimate phase noise. The authors propose to insert pilot symbols periodically into data stream to provide for accurate phase noise estimates at those times. A Wiener-interpolation is then applied on these phase noise estimates to derive linear minimum mean square error estimates for phase noise of all other symbols. In G. Ferrari, G. Colavolpe, and R. Raheli, "On linear predictive detection for communications with phase noise and frequency offset," *IEEE Transactions on Vehicular Technology*, vol. 56, No. 4, pp. 2073-2085, July 2007, Maximum A Posteriori (MAP) symbol detection algorithms are employed for channel decoding. To calculate posteriori probabilities, an indirect linear prediction strategy is proposed to estimate phase noise based on previous observed signals and transmitted codes. This phase noise estimation is, however, under a high Signal to Noise Ratio (SNR) assumption, which is not always a realistic scenario. In M. Martalo, G. Ferrari, M. Asim, J. Gambini, C. Mazzucco, G. Cannalire, S. Bianchi, and R. Raheli, "Reduced-complexity synchronization for high-order coded modulation," *IEEE ICC* 2015-*Signal Processing for Communications Symposium,* 2015, a MAP-based iterative channel decoding and demodulation algorithm is proposed where phase noise is estimated block-wise and based on an assumption that phase noise remains constant over a short window of symbols. This assumption is, however, not realistic and not applicable to higher order modulation or strong phase noise scenarios.

Carrier synchronization as disclosed herein estimates phase noise and removes the estimated phase noise symbol-by-symbol, which could be especially useful for challenging, high QAM scenarios.

1. System Challenges, Models and Definitions
1.A. Higher Order Modulations, Higher Capacity Moving toward higher order modulation is one possible solution to increase capacity in microwave backhaul links. As described above, due to limited allocated bandwidths, there are ongoing efforts to improve spectral efficiency of microwave backhauls.

Spectral efficiency is a measure of information rate over a band-limited channel in bit/s/Hz. Maximum attainable spectral efficiency is directly related to the number of bits represented by each symbol. Microwave backhauls employ well-developed Quadrature Amplitude Modulation (QAM) where an M-ary QAM represents $\log_2(M)$ bits/symbol. This means that a higher QAM level achieves higher spectral efficiency and capacity. To illustrate, a 4096-QAM (12 bits/symbol) provides 50 percent higher capacity compared to 256-QAM (8 bits/symbol).

This capacity boost comes at the cost of more complexity and challenges in system designs. Higher order modulations are achieved through very complicated modulation schemes that are, by far, more sensitive to additive white noise and phase noise. Challenges in meeting higher SNR requirements can be mitigated by taking advantage of recent advances in component technologies and using components that generate less equipment noise and signal distortion. Phase noise sensitivity remains one of the most challenging topics in higher-order modulation scenarios.

1.B. System Model

As mentioned earlier, microwave backhaul is an LOS channel. Hence, the observed signal at a receiver is defined as:

$$r(t)=s(t)e^{j\varphi(t)}+w(t) \qquad (1)$$

where s(t) is a transmitted symbol, w(t) is additive white Gaussian noise (AWGN) $w(t) \propto N(0, \sigma_N^2)$ and $\varphi(t)$ is total phase noise. Total phase noise $\varphi(t)=\alpha(t)+\beta(t)$ where $\alpha(t)$ and $\beta(t)$ are transmitter and receiver local oscillator phase noise, respectively.

Figure 1:
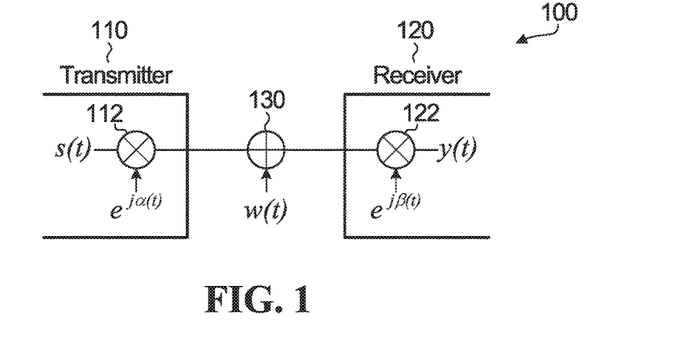
FIG. 1 is a block diagram of a system model.

FIG. 1 is a block diagram of a system model 100, which includes a transmitter 110, a receiver 120, transmitter and receiver multipliers 112, 122 representing the injection of local oscillator phase noise, and an adder 130 representing the injection of AWGN.

In this system model as shown in FIG. 1, transmitted symbols are corrupted by both white noise and phase noise, which complicates symbol detection and demodulation, especially with integrated CMOS oscillators and in higher modulation levels. As the order of modulation increases, accurate symbol detection becomes more sensitive to white noise and phase noise. To illustrate, even a very small phase noise of 1.9 degrees, without white noise, can lead to an incorrect constellation point decision in 1024 QAM demodulation at a receiver. This sensitivity increases as the order of QAM increases.

Higher order modulation may thus be impractical unless a well-defined carrier synchronization algorithm is provided to detect rapidly-varying phase noise symbol-by-symbol.

Embodiments disclosed herein may address phase noise challenges and allow high QAM levels.

1.C. Phase Noise Characteristics

Phase noise refers to phase modulated noise components ejected by a local oscillator. Phase noise spreads signal power to adjacent frequencies and creates noise sidebands. Phase noise is modeled as a wide sense stationary stochastic process that is added to the signal phasor. A common well-known model for phase noise is a Wiener process with independent and identically distributed (i.i.d) zero-mean Gaussian increments (Gaussian random walk).

In mathematics, a Wiener process is known as an integral of a white noise Gaussian process. This means that phase noise at each time can be shown as:

$$\varphi(t) = \int_0^t n(\alpha) d\alpha \qquad (2)$$

where n(t) is a zero-mean Gaussian with variance of $\sigma^2$ (i.e. $n(\alpha) \propto N(0, \sigma^2)$).

According to Eq. 2, phase noise variation from one symbol to a next symbol is derived as:

$$\Delta\varphi_k = \varphi_k - \varphi_{k-1} = \int_{(k-1)T}^{kT} n(\alpha) d\alpha \qquad (3)$$

where $\varphi_{k-1} = \varphi((k-1)T)$, $\varphi_k = \varphi(kT)$ and T is a symbol time. This means that phase noise variation from a symbol to next symbol is zero-mean Gaussian. The auto-correlation function of phase noise variation over a symbol can be derived as follows:

$$R_{\Delta\varphi}(k, m) = E\{\Delta\varphi_k \Delta\varphi^*_m\} = E\{\int_{(k-1)T}^{kT}\int_{(m-1)T}^{mT} n(\alpha)n^*(\beta) d\alpha d\beta\} = \int_{(k-1)T}^{kT}\int_{(m-1)T}^{mT} R_n(\alpha, \beta) d\alpha d\beta \qquad (4)$$

where $R_n(\alpha, \beta)$ is the autocorrelation of a white noise Gaussian process n(t). Hence, $$R_{\Delta\varphi}(k, m) = \int_{(k-1)T}^{kT}\int_{(m-1)T}^{mT} \sigma^2 \delta(\alpha-\beta) \, d\alpha d\beta = \sigma^2 T. \qquad (5)$$

This means that variance of phase noise from one symbol to a next symbol is:

$$\gamma^2 = R_{\Delta\varphi}(k, k) = \sigma^2 T. \qquad (6)$$

Phase noise variation at an $m^{th}$ symbol can now be defined as:

$$\varphi_m = \varphi_{m-1} + u. \qquad (7)$$

where $u \propto N(0, \gamma^2)$.

This equation implies that phase noise has one-symbol memory.

2. Phase Noise Estimation and Cancellation

In communication systems, whenever there is memory in a channel, a Maximum Likelihood Sequence Estimator (MLSE) decoder could be considered for implementation at a receiver. An MLSE decoder decides and detects symbols based on observation of a sequence of successive signals. This involves a sequential search through a trellis using a maximum likelihood criterion.

Memory in the phase noise enables use of a trellis-based sequential search algorithm to detect phase noise on a symbol-by-symbol basis. In an embodiment, phase noise is represented by a finite state machine and a trellis is formed to model phase noise variation from symbol to symbol.

To form a trellis, phase noise resolution and a phase span region are first defined. Resolution of phase noise estimates should be fine enough not to degrade phase noise estimation accuracy, especially for extremely high levels of modulations. To define phase noise span region, phase noise statistical behavior could be investigated over t seconds. Considering t=mT, if the same relation of Eq. 7 is repeatedly applied to phase noise of all previous symbols, then:

$$\varphi_m = \varphi_0 + v. \qquad (8)$$

where $v \propto N(0, m\gamma^2)$.

This continuously increasing variance emphasizes a trellis to screen the whole $[-\pi, \pi]$ region to cover all probable phase noise values. Implementation of such a large trellis, however, is impractical.

To address this challenge, pilot symbols are transmitted to shrink the trellis phase span region. In Simon et al. referenced above, an adapted interpolation of pilots has been proposed to estimate phase noise. However, accuracy of phase noise estimates under this method is not acceptable for higher-order modulations. In the present application, an interpolation is applied to pilot phase noise estimates. This pilot-aided interpolation can be used to reduce the variance of phase noise and the trellis phase span region. The interpolation is a linear interpolation in an embodiment, but other types of interpolation could be applied in other embodiments.

Figure 2:
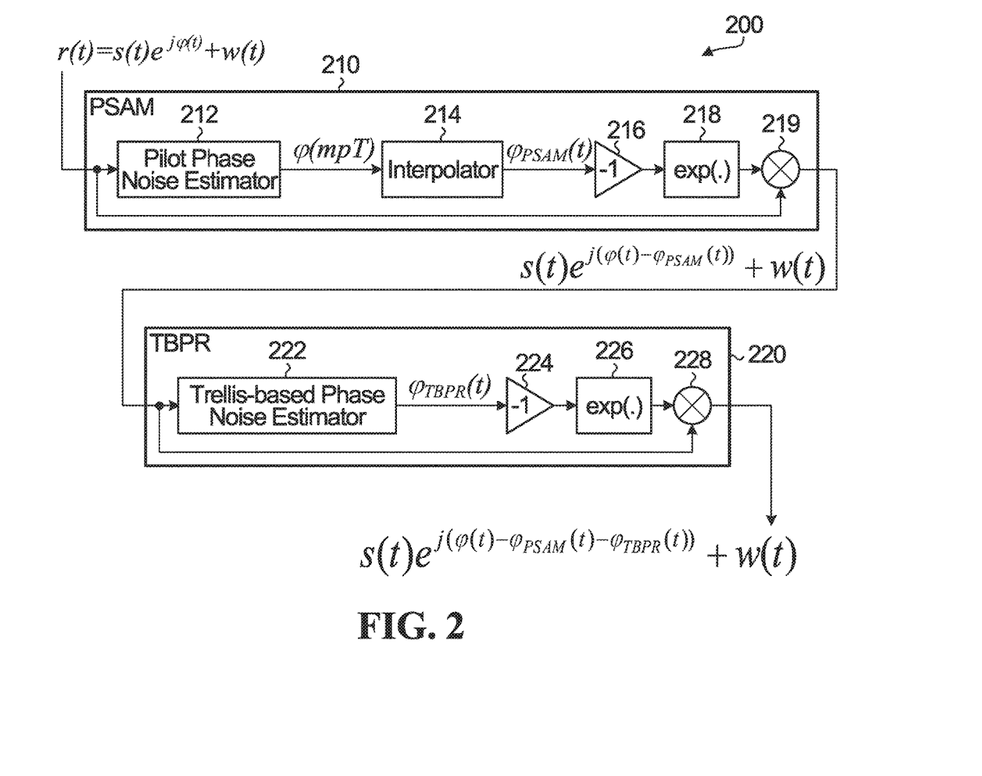
FIG. 2 is a block diagram of an apparatus that implements phase noise estimation and cancellation according to an embodiment.

FIG. 2 is a block diagram of an apparatus 200 that implements phase noise estimation and cancellation according to an embodiment. The example apparatus 200 includes a pilot symbol aided module (PSAM) 210 and a trellis based phase noise recovery (TBPR) module 220 coupled to the PSAM 210. The PSAM 210 and the TBPR module 220 could be implemented using hardware, firmware, components which execute software, or some combination thereof. Electronic devices that might be suitable for implementing either or both of these components, or any or all of the elements illustrated as parts of these components, include microprocessors, microcontrollers, Programmable Logic Devices (PLDs), Field Programmable Gate Arrays (FPGAs), Application Specific Integrated Circuits (ASICs), and other types of "intelligent" integrated circuits.

The example apparatus 200 estimates rapidly-varying phase noise symbol-by-symbol. The PSAM 210 is configured to estimate phase noise of pilot symbols and linearly interpolate them for symbols between the pilot symbols. The TBPR module 220 employs BCJR sequence estimation in an embodiment, to detect residual phase noise of symbols from the PSAM 210, symbol-by-symbol.

2.A. Pilot Symbol Aided Module

The example apparatus 200 implements a pilot-aided technique. At pilot times, it is possible to have an accurate estimate of phase noise, because white noise is negligible relative to signal strength. In the PSAM 210, phase noise is estimated at pilot symbols and then these estimated phase noise values are interpolated to reach an estimate for the phase noise for other symbols. The PSAM 210 includes a pilot phase noise estimator at 212 to estimate pilot phase noise based on the received pilot symbols. An interpolator is provided at 214 to apply an interpolation to the estimated pilot phase noise. The interpolated phase noise estimate is inverted by the inverter 216, exponentiated at 218, and applied to the received symbol by the multiplier 219 to cancel the interpolated phase noise estimate from the received symbol. The components 216, 218, 219 in FIG. 2 represent an example of a phase noise canceller.

Figure 3:
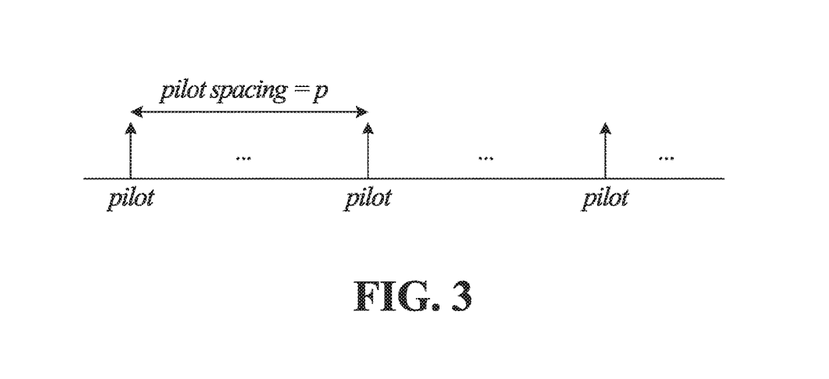
FIG. 3 is a plot illustrating an interleaved pattern for pilot symbol transmission.

In an embodiment, pilot symbols, which are also referred to herein simply as "pilots", are transmitted in an interleaved pattern as shown in FIG. 3. In this pattern, pilot symbols are transmitted once in every p symbols, and p is therefore the pilot spacing. A consecutive pilot pattern is not helpful for phase noise, unlike white noise. Phase noise is a Wiener process, which means it is a colored noise. With an interleaved pilot pattern, the phase noise process is in effect down-sampled by p. Interpolation of the pilot samples by the interpolator 214 in FIG. 2 may enable suppression of phase noise at frequencies below $$f = \frac{1}{2pT} \text{Hz}.$$

This may significantly reduce the level of phase noise and consequently reduce the trellis phase span region.

Residual phase noise after the example PSAM 210 that employs linear interpolation the interpolator 214, $\varphi_{res}(t)$, is defined as:

$$\varphi_{res}(t) = \varphi(t) - \varphi_{PSAM}(t) \quad (9)$$

where $\varphi(t)$ is actual phase noise (the input to the PSAM 210) and $\varphi_{PSAM}(t)$ is the linearly-interpolated phase noise (the output of the PSAM). Considering $(m-1)pT < t < mpT$, $\varphi_{PSAM}(t)$ may be calculated as follows:

$$\varphi_{PSAM}(t) = \varphi_{(m-1)p} + \frac{\varphi_{mp} - \varphi_{(m-1)p}}{pT}(t - (m-1)pT) \quad (10)$$

where $\varphi_{(m-1)p} = \varphi(t=(m-1)pT)$ and $\varphi_{mp} = \varphi(t=mpT)$. Hence:

$$\varphi_{res}(t) = \varphi(t) + \varphi_{(m-1)p}\left(\frac{t}{pT} - m\right) + \varphi_{mp}\left(m - \frac{t}{pT} - 1\right). \quad (11)$$

Variance of residual phase noise may be derived as follows:

$$\tilde{\sigma}^2 = \text{var}(\varphi_{res}(t)) = \quad (12)$$

$$\frac{t_2}{pT} + (1-2m)t + (m^2 - m)pT = \frac{1}{pT}(t - (m-1)pT)(t - mpT).$$

Figure 4:
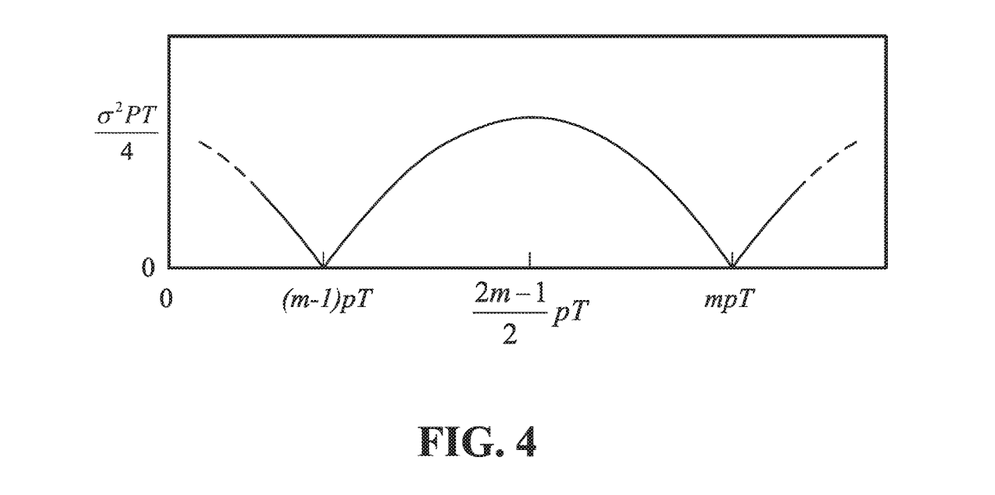
FIG. 4 is a plot illustrating variance of residual phase noise after the pilot symbol aided module 210 in FIG. 2.

This is a hyperbolic equation with one maximum at $$t = \frac{2m-1}{2}pT$$

and zeros at pilot times of $(m-1)pT$ and $mpT$. To illustrate, FIG. 4 shows variance of residual phase noise after the PSAM 210. As shown, the variance of residual phase noise is periodic, and is zero at pilot times and reaches a maximum $$\left(\text{i.e. } \tilde{\sigma}_{max}^2 = \frac{\sigma^2 PT}{4}\right)$$

at middle-pilot symbols (symbols that occur exactly in the middle of a pilot spacing).

Figure 5A:
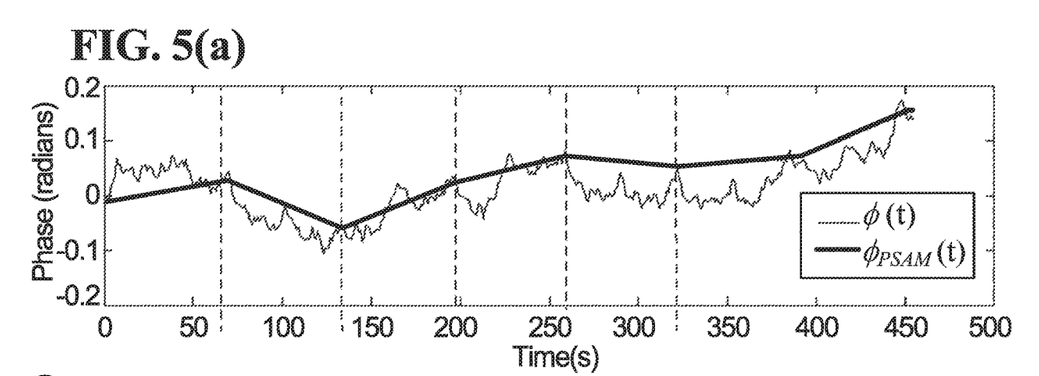
FIG. 5(a) is a plot illustrating sample input and output phase noises φ(t) and $\varphi_{PSAM}(t)$, before and after pilot symbol aided phase noise estimation.
Figure 5B:
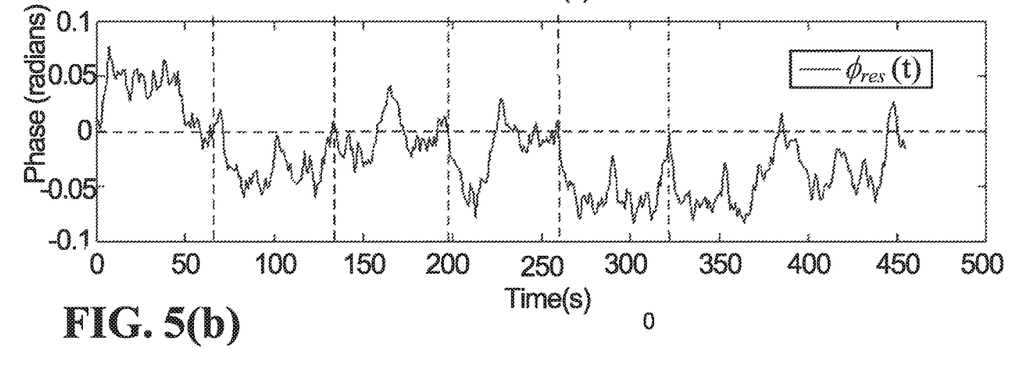
FIG. 5(b) is a plot illustrating residual phase noise after pilot symbol aided phase noise cancellation.
Figure 5C:
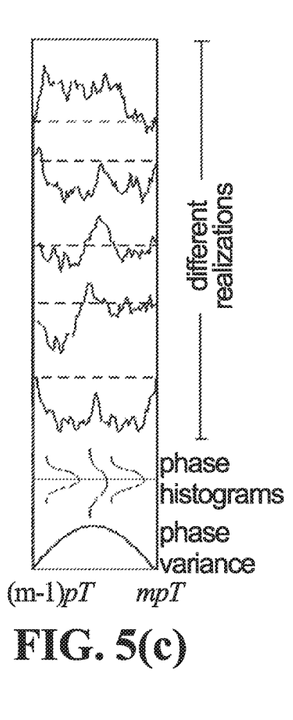
FIG. 5(c) is a plot illustrating that the residual phase noise shown in FIG. 5(b) is a Wide Sense CycloStationary (WSCS) process.

FIG. 5(a) shows sample input and output phase noises ($\varphi(t)$ and $\varphi_{PSAM}(t)$, respectively) of the PSAM 210. Residual phase noise of the PSAM 210 (shown in FIG. 5(b)) is a Wide Sense CycloStationary (WSCS) process. As shown in FIG. 5(c), each pilot space of $\varphi_{res}(t)$ acts as a different realization that may help in investigating statistical characteristics of phase noise entering the TBPR module 220.

2.B. Trellis Based Phase Noise Recovery

With reference again to FIG. 2, as discussed above the PSAM 210 is able to cancel phase noise that is estimated based on interpolation of pilot symbol aided phase noise estimates. However, the level of residual phase noise after the PSAM 210 might not be low enough to allow high order modulations. The TBPR module 220 is configured to apply a trellis-based sequential search that estimates residual phase noise after the PSAM 210 and removes the estimated residual phase noise.

The TBPR module 220 takes advantage of phase noise memory and represents phase noise as a finite state machine in one embodiment. Memory of phase noise need not be restricted to one direction. However, Viterbi (MLSE) trellis-based phase noise estimation, for example, benefits from only one direction of phase memory. Memory of phase noise could be interpreted bi-directionally, in embodiments that use a BCJR-based algorithm for phase noise estimation, for instance.

A BCJR-based algorithm, or more generally trellis-based phase noise estimation, may benefit from bi-directional memory of phase noise. Between each two successive pilots, two trellises (forward and reverse) may be formed, to model phase noise variation symbol-to-symbol for all in-between symbols that occur between pilots. In these trellises, nodes are candidates or representatives for phase noise and branches are candidates or representatives for possible phase noise variation from one symbol to the next symbol.

The TBPR module 220 includes a trellis-based phase noise estimator at 222 to perform single-pass phase noise estimation. Trellis-based phase noise estimation is a single-pass procedure for any received symbol. In a single pass for each received symbol, a phase noise estimate is generated for that symbol. The estimated phase noise is inverted by the inverter 224, exponentiated at 226, and applied to the received symbol by the multiplier 228 to cancel the estimated phase noise from the received symbol. The components 224, 226, 228 in FIG. 2 represent an example of a phase noise canceller.

The number of nodes N in a trellis is defined by trellis phase span and phase resolution δ. Trellis phase span is defined based on the maximum variance of PSAM residual phase noise $\tilde{\sigma}_{max}^2$. To illustrate, a trellis phase span of $6.6\tilde{\sigma}_{max}$ could be used to avoid out of range events for phase noise in a run length of $1e^{12}$ symbols.

Similarly, the number of outgoing branches from each node, denoted as 2L+1, is defined considering variance of phase noise variation from one symbol to the next symbol $\gamma^2$ and phase resolution δ. For instance, with phase resolution of δ=0.01 rad and $\gamma^2=1e^{-4}$, five outgoing branches could cover phase noise jumps of [−0.02, 0.01, 0, 0.01, 0.02] rad between two consequent symbols, for example, which covers about 96 percent of events.

In some embodiments, PSAM residual phase noise is considered to be zero at pilots. In other embodiments, several possible nodes are considered even at pilot times.

Starting from a pilot in an embodiment in which initial or PSAM residual phase noise is considered to be zero, the initial node of each trellis would be zero, with probability of one, since phase and therefore phase noise are known at pilots. Trellis probability metrics could be calculated by considering effects of both phase noise and white noise. In an embodiment, the probability metric at time instance t=kT is calculated based on a maximum likelihood criterion as:

$$PM_k = \Sigma_{n=1}^k \ln p(r(t=nT)|\varphi_n, \varphi_{n-1}) \quad (13)$$

where $\varphi_n$ represents phase noise at t=nT, $\varphi_{n-1}$ represents phase noise at t=(n-1)T such that $\varphi_{n-1} \in \{\varphi_n - [-L\delta:\delta: L\delta]\}$, and $$p(r(t=nT)|\varphi_n, \varphi_{n-1}) = p(r_n|\varphi_n)p(\varphi_n|\varphi_{n-1}). \quad (14)$$

The conditional probability $p(r_n|\varphi_n)$ is calculated based on hard slicer error as:

$$p(r_n | \varphi_n) = \frac{1}{\sqrt{\pi \sigma_N^2}} e^{\frac{-(r_n e^{-j\varphi_n} - \hat{s}_n)^2}{\sigma_N^2}} \quad (15)$$

where $\hat{s}_n$ represents slicer output for a rotated received signal $r_n e^{-j\varphi_n}$. According to Eq. 7, phase conditional probability $p(\varphi_n|\varphi_{n-1})$ is defined as:

$$p(\varphi_n | \varphi_{n-1}) = \frac{1}{\sqrt{2\pi\gamma^2}} e^{\frac{|\varphi_n - \varphi_{n-1}|^2}{2\gamma^2}}. \quad (16)$$

With reference to Eq. 7, it can be seen that phase noise at an $M^{th}$ symbol $\varphi_m$ is a summation of phase noise at $m-1^{th}$ symbol $\varphi_{m-1}$ and a Gaussian random variable u. Given the value of $\varphi_{m-1}$, which is a known deterministic value, conditional Probability Density Function (PDF) of $\varphi_m$ is a Gaussian distribution with mean equal to: $E\{\varphi_m\}=\varphi_{m-1}$ and variance of: $var(\varphi_m)=\gamma^2$. Eq. 16 is the conditional PDF of phase noise at $m^{th}$ symbol ($\varphi_m$) considering described statistical characteristics.

In a BCJR-based algorithm, the probability metric of each node at each symbol time may be calculated as the total probability of all paths reaching to that node starting from the trellis initial node for a pilot symbol. This is different from an MLSE algorithm that keeps the most likely path for each node at each time step.

Upon reception of the next symbol at the time instant $t=(k+1)T$, all nodes are extended by one stage based on the current symbol phase noise. As mentioned earlier, there are $2L+1$ outgoing branches from each node, and these branches represent possible phase noise jumps from one symbol to the next symbol. This means that each phase noise node is extended to $2L+1$ nodes, resulting in a total of $(2L+1)N$ new paths for a trellis stage that includes N nodes. Given probability metrics of all phase nodes at a previous time step, a new metric for each node in a current time step may be calculated as follows:

$$PM_{k+1} = PM_k + \ln \Sigma_i p(r_{k+1} | \varphi_{k+1}, \varphi_k(i^{th} \text{ node}))$$
$$i \in \{j | \varphi_{k+1} = \varphi_k(j^{th} \text{ node}) + [-L\delta : \delta : L\delta]\} \quad (17)$$

Figure 6:
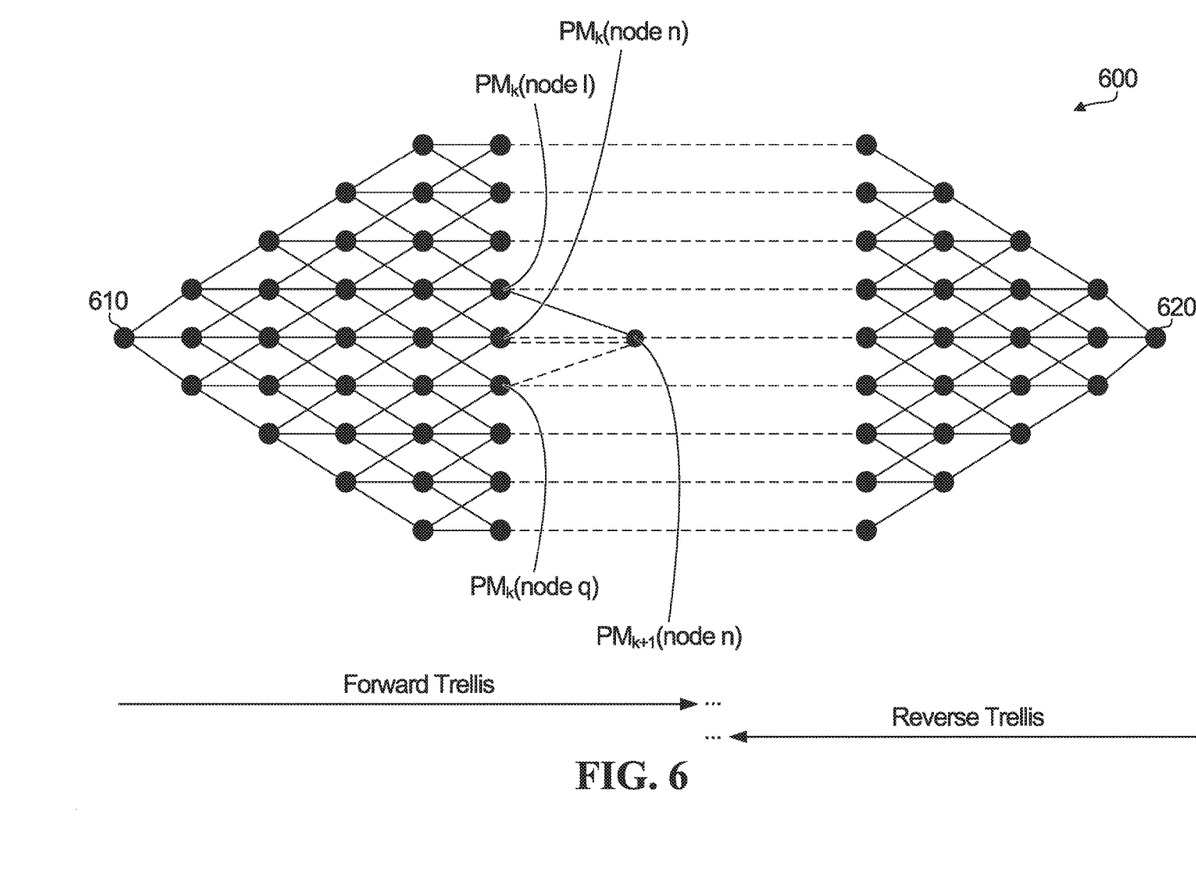
FIG. 6 is a representation of an example trellis.

FIG. 6 is a representation of a trellis 600. An initial node for a pilot symbol is shown at 610, and a forward direction trellis extends from that initial node. A reverse direction trellis extends from the initial node 620 for the next pilot node. In these trellises, nodes are candidates or representatives for phase noise and branches are candidates or representatives for possible phase noise variation from one symbol to the next symbol. In the example shown, there are three branches from each node to a next-symbol node. Each upper branch represents a phase noise jump to higher phase noise than the current node for the current sample, each middle branch represents the same phase noise as the current node for the current sample, and each lower branch represents a phase noise jump to lower phase noise than the current node for the current sample. The phase noise jumps in one embodiment are +0.01 rad, 0, and −0.01 rad for the upper, middle, and lower branches. Other phase noise jumps are possible.

A probability of node n, for a (k+1)th symbol after the pilot symbol associated with the initial node 610, is calculated based on Eq. 17 by considering $PM_k$ of nodes I, n, q for the preceding kth symbol, as shown.

In an embodiment, probability metrics are calculated independently for each trellis (forward/reverse directions). A decision metric of each node at each symbol time may then be defined as a total of its forward and reverse probability metrics at that time. At each symbol time, the phase node that has the maximum total metric is selected as the estimated phase noise of that symbol.

Decision metrics could instead be calculated as a weighted sum, based on the distances of the current symbol from the initial node of the forward direction trellis and from the initial node of the reverse direction trellis, or equivalently the distances between the current symbol and the pilots before and after that symbol. For example, a higher weight could be applied to the forward direction trellis probability than the reverse direction trellis if the current symbol is closer to its preceding pilot than to its following pilot.

It should be noted that phase noise might not be completely removed. It is expected that a small residual phase noise will remain after the TBPR module 220 in FIG. 2 due to estimation error. This residual phase noise may cause slicer error, but small enough error to be detected and corrected by commonly used Low Density Parity Check (LDPC) forward error correction. In the present disclosure, estimated phase noise is cancelled, and therefore actual phase noise might not necessarily be entirely cancelled.

3. Example Method, Receiving Device, and Communication System

Figure 7:
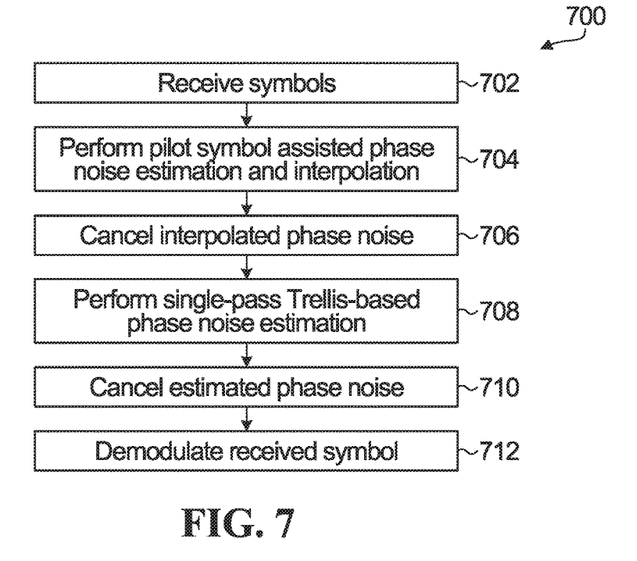
FIG. 7 is a flow diagram of a method according to an embodiment.

Various aspects of the present disclosure are generally described above. FIG. 7 is a flow diagram of a method according to an embodiment. The example method 700 involves receiving symbols at 702, in a communication signal. The symbols include pilot symbols interleaved with communication symbols in a received symbol stream.

Some embodiments involve performing pilot symbol assisted phase noise estimation and interpolation, as shown at 704. For example, the symbol stream received at 702 may include a first pilot symbol that precedes a current symbol in the received symbol stream and a second pilot symbol that follows the current symbol in the received symbol stream. In an embodiment, the pilot symbol assisted phase noise estimation and interpolation at 704 involves calculating a first pilot-assisted phase noise estimate based on the first pilot symbol and a second pilot-assisted phase noise estimate based on the second pilot symbol. An interpolation between at least the first and second pilot-assisted phase noise estimates may be performed to calculate an interpolated phase noise estimate for the current symbol. A linear interpolation between the first and second pilot-assisted phase noise estimates is used in one embodiment. In other embodiments, different types of interpolation using more than two pilots could be applied. In a scenario with high white noise for example, a Wiener interpolation which uses M pilots and not just two pilots as described above could be applied to perform interpolation. Such an interpolation could use M/2 pilots before the current symbol and M/2 pilots after the current symbol.

The interpolated phase noise estimate is cancelled from the current symbol at 706. The current symbol, with the interpolated phase noise estimate cancelled, is provided as an input symbol for single-pass trellis-based phase noise estimation at 708.

The phase noise affecting the current symbol is estimated by performing a single-pass trellis-based estimation at 708. In the embodiment shown in FIG. 7, this phase noise is residual phase noise after pilot symbol assisted phase noise estimation and cancellation at 704, 706. This trellis-based estimated phase noise is cancelled from the current symbol at 710.

The trellis-based estimation could be BCJR-based estimation or Viterbi-based estimation, for example. BCJR-based estimation could involve forming a forward direction trellis in a forward direction from a first pilot symbol that precedes the received symbol in the received symbol stream, and forming a reverse direction trellis in a reverse direction from a second pilot symbol that follows the received symbol in the received symbol stream. The estimated phase noise could then be determined based on probabilities associated with the forward direction trellis and the reverse direction trellis. In some embodiments, the estimated phase noise is determined based on a sum of probabilities associated with the forward direction trellis and the reverse direction trellis, or a weighted sum of probabilities associated with the forward direction trellis and the reverse direction trellis.

The example method 700 is illustrative of one embodiment. Other embodiments could include different or additional operations, and/or performing operations in a different order than shown. For example, the operations at 704, 706, 708, 710 could be repeated for multiple symbols. The symbols could be QAM symbols, including high-order QAM symbols for 1k or higher QAM. After phase noise cancellation, received symbols could be provided to a demodulator for demodulation, as shown at 712. Other examples of additional operations that may be performed, and/or various ways to perform the illustrated operations, may be or become apparent from the present disclosure.

Figure 8:
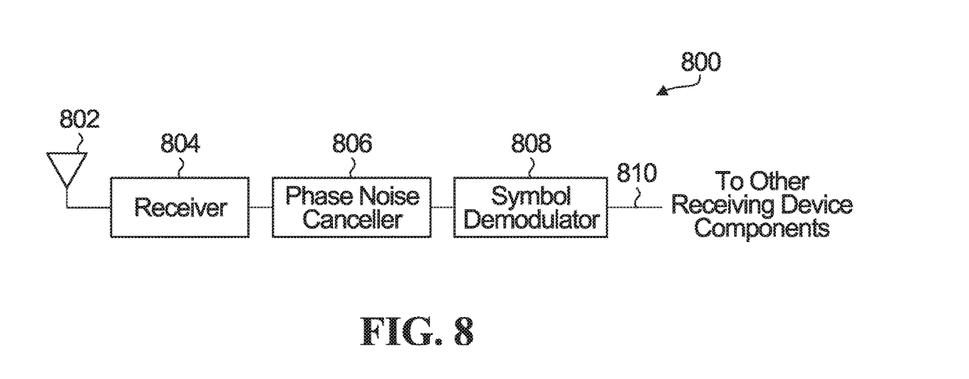
FIG. 8 is a block diagram illustrating an example receiving device according to an embodiment.

FIG. 8 is a block diagram illustrating an example receiving device according to an embodiment, which may perform the methods disclosed herein. The example receiving device 800, which could be user equipment (UE) or network equipment, includes a receiver 804 coupled to a phase noise canceller 806, which is coupled to a symbol demodulator 808. In the illustrated embodiment, the receiver 804 has an antenna 802 for receiving signals from a wireless channel. In some embodiments, the receiver 804 includes an amplifier, a frequency downconverter, an analog to digital converter, and/or other components of a radio frequency (RF) receive chain. The receiver 804 receives, via the antenna 802, a received signal that includes symbols. The received symbols are provided to the phase noise canceller 806. The phase noise canceller 806 is configured to implement a method as described above to estimate phase noise and cancel the estimated phase noise from received symbols. The symbol demodulator 808 is coupled to the phase noise canceller 806 to demodulate received symbols from which estimated phase noise has been cancelled, and provides demodulated received information as output 810.

In some embodiments, a non-transitory computer readable medium comprising instructions for execution by a processor may be provided to control operation of the phase noise canceller 806 and the symbol demodulator 808, and/or to otherwise control the execution of methods described above. In an embodiment, such an apparatus includes the receiver 804 to receive communication symbols that include symbols, and a processor coupled to the receiver and configured to perform a method that involves performing single-pass trellis-based estimation of phase noise affecting a received symbol and cancelling the estimated phase noise from the received symbol.

In some embodiments, the processor may be a component of a general-purpose computer hardware platform. In other embodiments, the processor may be a component of a special-purpose hardware platform. For example, the processor may be an embedded processor, and the instructions may be provided as firmware. Some embodiments may be implemented by using hardware only. In some embodiments, the instructions for execution by a processor may be embodied in the form of a software product. The software product may be stored in a non-volatile or non-transitory storage medium, which can be, for example, a compact disc read-only memory (CD-ROM), universal serial bus (USB) flash disk, or a removable hard disk.

The phase noise canceller 806 could include an apparatus as shown in FIG. 2. In an embodiment, the symbol demodulator 808 includes a slicer and a QAM demapper.

In operation, the receiver 804 receives a communication signal that includes a symbol. A trellis-based phase noise estimator 222 (FIG. 2) in the phase noise canceller 806 is coupled to the receiver 804, to perform single-pass trellis-based estimation of phase noise affecting the symbol. As noted above, the components 224, 226, 228 in FIG. 2 represent an example of a phase noise canceller, and could be coupled to the trellis-based phase noise estimator in the phase noise canceller 806, to cancel the estimated phase noise from the symbol.

The communication signal received by the receiver 804 could include a symbol stream that includes not only a current symbol, but also pilot symbols interleaved with the current symbol and other communication symbols. The pilot symbols include at least a first pilot symbol that precedes the current symbol in the symbol stream and a second pilot symbol that follows the symbol in the symbol stream.

The trellis-based phase noise estimator could be configured to form a forward direction trellis in a forward direction from the first pilot symbol, to form a reverse direction trellis in a reverse direction from the second pilot symbol, and to determine the estimated phase noise based on probabilities associated with the forward direction trellis and the reverse direction trellis in a single pass of the trellis to estimate the phase noise.

In an embodiment, the trellis-based phase noise estimator is configured to determine the estimated phase noise based on one of: a sum of probabilities associated with the forward direction trellis and the reverse direction trellis, and a weighted sum of probabilities associated with the forward direction trellis and the reverse direction trellis.

The trellis-based phase noise estimator could also or instead be configured to perform the trellis-based estimation as one of: BCJR-based estimation and Viterbi-based estimation.

A pilot symbol assisted module, such as the PSAM 210 in FIG. 2, could be implemented in the phase noise canceller 806 and coupled to the trellis-based phase noise estimator, to calculate a first pilot-assisted phase noise estimate based on the first pilot symbol and a second pilot-assisted phase noise estimate based on the second pilot symbol. The pilot symbol assisted module could also be configured to perform an interpolation between at least the first and second pilot-assisted phase noise estimates to calculate an interpolated phase noise estimate for the symbol, and to cancel the interpolated phase noise estimate from the symbol. The symbol, with the interpolated phase noise estimate cancelled, could then be provided as an input symbol for the trellis-based phase noise estimator.

The pilot symbol assisted module could be configured to perform the interpolation as a linear interpolation or an interpolation based on more than two pilot-assisted phase noise estimates.

Embodiments disclosed herein could be implemented for phase noise estimation and cancellation for QAM symbols, such as in 1k or higher order QAM.

A communication device could include both receiver components as shown, and transmitter components. For example, a symbol modulator to generate symbols, such as a QAM modulator to generate QAM symbols, could be coupled to a transmitter. In a device that includes the components shown in FIG. 8, the transmitter would be coupled to the antenna 802. The receiver 804 and a transmitter could be implemented in a transceiver that supports both receiving and transmitting.

Figure 9:
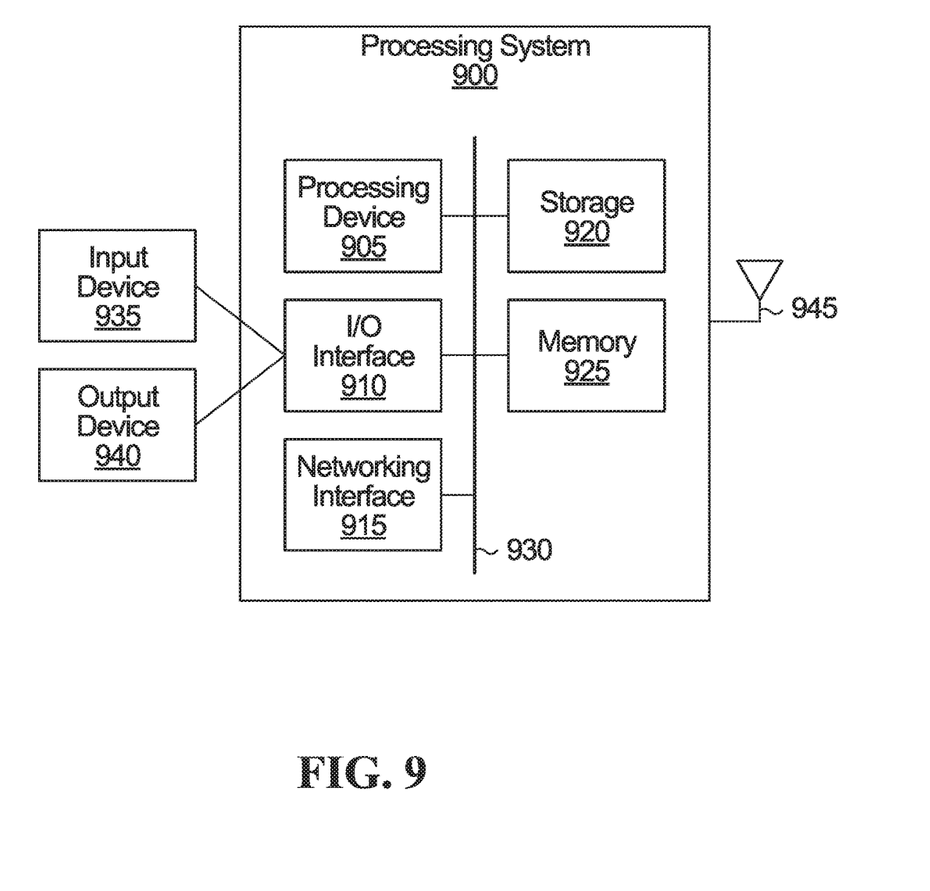
FIG. 9 is a block diagram of an example simplified processing system, which may be used to implement embodiments disclosed herein.

FIG. 8 is a generalized block diagram of a device in which phase noise estimation and correction could be implemented. FIG. 9 is a block diagram of an example simplified processing system 900, which may be used to implement embodiments disclosed herein, and provides a higher level implementation example. The apparatus 200 (FIG. 2) or the device 800 (FIG. 8) may be implemented using the example processing system 900, or variations of the processing system 900. The processing system 900 could be a server or a mobile device, for example, or any suitable processing system. Other processing systems suitable for implementing embodiments described in the present disclosure may be used, which may include components different from those discussed below. Although FIG. 9 shows a single instance of each component, there may be multiple instances of each component in the processing system 900.

The processing system 900 may include one or more processing devices 905, such as a processor, a microprocessor, an application-specific integrated circuit (ASIC), a field-programmable gate array (FPGA), a dedicated logic circuitry, or combinations thereof. The processing system 900 may also include one or more input/output (I/O) interfaces 910, which may enable interfacing with one or more appropriate input devices 935 and/or output devices 940. The processing system 900 may include one or more network interfaces 915 for wired or wireless communication with a network (e.g., an intranet, the Internet, a P2P network, a WAN and/or a LAN) or other node. The network interfaces 915 may include wired links (e.g., Ethernet cable) and/or wireless links (e.g., one or more antennas) for intra-network and/or inter-network communications. The network interfaces 915 may provide wireless communication via one or more transmitters or transmit antennas and one or more receivers or receive antennas, for example. In this example, a single antenna 945 is shown, which may serve as both transmitter and receiver. However, in other examples there may be separate antennas for transmitting and receiving. The processing system 900 may also include one or more storage units 920, which may include a mass storage unit such as a solid state drive, a hard disk drive, a magnetic disk drive and/or an optical disk drive.

The processing system 900 may include one or more memories 925, which may include a volatile or non-volatile memory (e.g., a flash memory, a random access memory (RAM), and/or a read-only memory (ROM)). The non-transitory memories 925 may store instructions for execution by the processing devices 905, such as to carry out examples described in the present disclosure. The memories 925 may include other software instructions, such as for implementing an operating system and other applications/functions. In some examples, one or more data sets and/or modules may be provided by an external memory (e.g., an external drive in wired or wireless communication with the processing system 900) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 930 providing communication among components of the processing system 900. The bus 930 may be any suitable bus architecture including, for example, a memory bus, a peripheral bus or a video bus. In FIG. 9, the input devices 935 (e.g., a keyboard, a mouse, a microphone, a touchscreen, and/or a keypad) and output devices 940 (e.g., a display, a speaker and/or a printer) are shown as external to the processing system 900. In other examples, one or more of the input devices 935 and/or the output devices 940 may be included as a component of the processing system 900.

Figure 10:
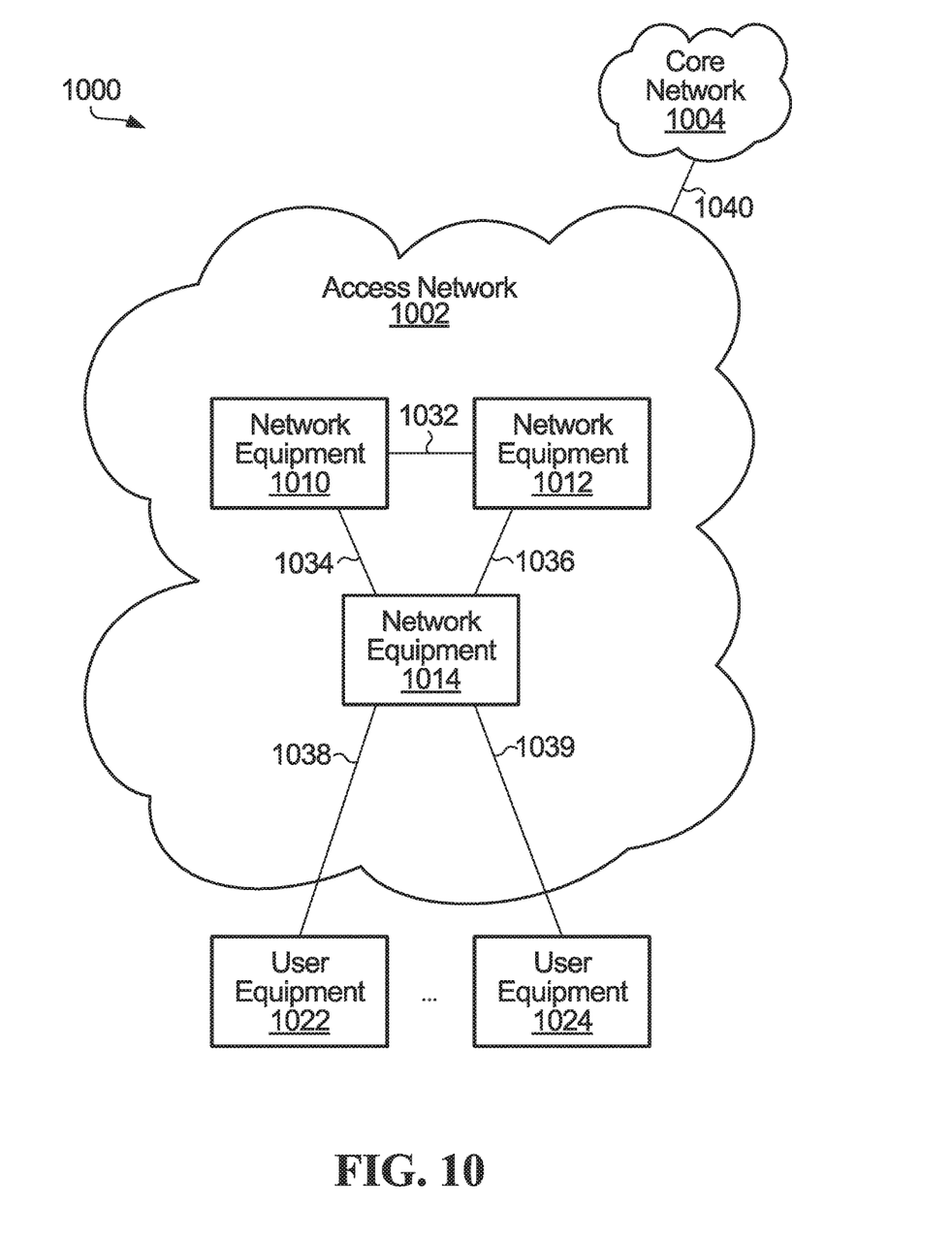
FIG. 10 is a block diagram of an example communication system.

FIG. 10 is a block diagram of an example communication system in which embodiments of the present disclosure could be implemented. The example communication system 1000 in FIG. 10 includes an access network 1002 and a core network 1004. The access network 1002 includes network equipment 1010, 1012, 1014 which communicates over network communication links 1032, 1034, 1036, and user equipment 1022, 1024 which communicates with network equipment 1014 in the example shown, over access communication links 1038, 1039. The access network 1002 communicates with the core network 1004 over another network communication link 1040. The core network 1004, like the access network 1002, may include network equipment that communicates with one or more installations of the network equipment 1010, 1012, 1014 in the access network 1002. However, in a communication system with an access network 1002 and a core network 1004, the core network might not itself directly provide communication service to user equipment.

The communication system 1000 is intended solely as an illustrative example. An access network 1002 could include more or fewer than three installations of network equipment, for example, which might or might not all directly communicate with each other as shown. Also, more than one installation of network equipment in the access network 1002 could provide communication service to user equipment. There could be more than one access network 1002 coupled to a core network 1004. It should also be appreciated that the present disclosure is not in any way limited to communication systems having an access network/core network structure.

Considering the access network 1002, any of various implementations are possible. The exact structure of network equipment 1010, 1012, 1014, and user equipment 1022, 1024 for which such network equipment provides communication service, is implementation-dependent. Phase noise estimation and cancellation as disclosed herein could be implemented as at least the network equipment 1010, 1012, 1014, in conjunction with microwave backhaul for example. Phase noise estimation and cancellation could also or instead be implemented at use equipment 1022, 1024.

At least the network equipment 1014 that provides communication service to the user equipment 1022, 1024 includes a physical interface and communications circuitry to support access-side communications with the user equipment over the access links 1038, 1039. The access-side physical interface could be in the form of an antenna or an antenna array, for example, where the access communication links 1038, 1039 are wireless links. In the case of wired access communication links 1038, 1039, an access-side physical interface could be a port or a connector to a wired communication medium. Multiple access-side interfaces could be provided at the network equipment 1014 to support multiple access communication links 1038, 1039 of the same type or different types, for instance. The type of communications circuitry coupled to the access-side physical interface or interfaces at the access network equipment 1014 is dependent upon the type or types of access communication links 1038, 1039 and the communication protocol or protocols used to communicate with the user equipment 1022, 1024.

The network equipment 1010, 1012, 1014 also includes a network-side physical interface, or possibly multiple network-side physical interfaces, and communications circuitry to enable communications with other network equipment in the access network 1002. At least some installations of network equipment 1010, 1012, 1014 also include one or more network-side physical interfaces and communications circuitry to enable communications with core network equipment over the communication link 1040. There could be multiple communication links between network equipment 1010, 1012, 1014 and the core network 1004. Network-side communication links 1032, 1034, 1036 in the access network 1002, and the communication link 1040 to the core network 1004, could be the same type of communication link. In this case the same type of physical interface and the same communications circuitry at the network equipment 1010, 1012, 1014 could support communications between access network equipment within the access network 1002 and between the access network 1002 and the core network 1004. Different physical interfaces and communications circuitry could instead be provided at the network equipment 1010, 1012, 1014 for communications within the access network 1002 and between the access network 1002 and the core network 1004.

Network equipment in the core network 1004 could be similar in structure to the network equipment 1010, 1012, 1014. However, as noted above, network equipment in the core network 1004 might not directly provide communication service to user equipment and therefore might not include access-side physical interfaces for access communication links or associated access-side communications circuitry. Physical interfaces and communications circuitry at network equipment in the core network 1004 could support the same type or types of network communication link or links in the access network 1002, different type or types of network communication link or links, or both.

Just as the exact structure of physical interfaces at network equipment 1010, 1012, 1014 and network equipment in the core network 1004 is implementation-dependent, the associated communications circuitry is implementation-dependent as well. In general, hardware, firmware, components which execute software, or some combination thereof, might be used in implementing such communications circuitry. Examples of electronic devices that might be suitable for implementing communications circuitry are provided above.

Each installation of user equipment 1022, 1024 includes a physical interface and communications circuitry compatible with an access-side physical interface and communications circuitry at the network equipment 1014, to enable the user equipment to communicate with the network equipment. Multiple physical interfaces of the same or different types could be provided at the user equipment 1022, 1024. The user equipment 1022, 1024 could also include such components as input/output devices through which functions of the user equipment are made available to a user. In the case of a wireless communication device such as a smartphone, for example, these functions could include not only communication functions, but other local functions which need not involve communications. Different types of user equipment 1022, 1024, such as different smartphones for instance, could be serviced by the same network equipment 1014.

Any of the communication links 1032, 1034, 1036, 1038, 1039, 1040, and communication links in the core network 1004 could potentially be or include wireless communication links. Such communication links tend to be used more often within an access network 1002 than in a core network 1004, although wireless communication links at the core network level are possible. In one embodiment, the phase noise estimation and cancellation as disclosed herein is used at least for wireless backhaul in the access network 1002.

4. Performance Evaluation

For performance evaluation a single carrier, line of sight platform including carrier synchronization as disclosed herein was implemented on a XILINX VC 707 FPGA board for long runs of $1e^{12}$ symbols. White Gaussian noise samples were generated by applying a Box-Muller transform on uniformly distributed pseudorandom noise of a MATLAB PN sequence generator block. Wiener phase noise samples were then generated by applying an integrator on samples of the white Gaussian noise. Performance was evaluated with linear interpolation in pilot symbol assisted phase noise estimation and cancellation and with BCJR-based phase noise estimation and cancellation.

Trellis phase span affects phase noise estimation performance. Trellis phase span should be large enough to cover all probable phase noise values, and still small enough to maintain an acceptable level of complexity. For a phase noise level of −82 dBC/Hz @100 KHz with bandwidth of 6.1 MHz and pilot spacing of 50 symbols, an FPGA run of $2.4e^{12}$ symbols indicates 16271 events of TBPR deciding a node within a region of $|\varphi| \geq 0.36$ rad. This result is consistent with an expectation of 22928 events of $|\varphi_{res}| \geq 0.36$ rad calculated using $\tilde{\sigma}^2$ of Eq. 12. To cover even highly improbable phase noise values, trellis phase span is defined based on the maximum variance of PSAM residual phase noise $\tilde{\sigma}_{max}^2$. A trellis phase span of $6.6\tilde{\sigma}_{max}$ may be useful in avoiding out of range TBPR error events in $1e^{12}$ symbols, for example.

Figure 11:
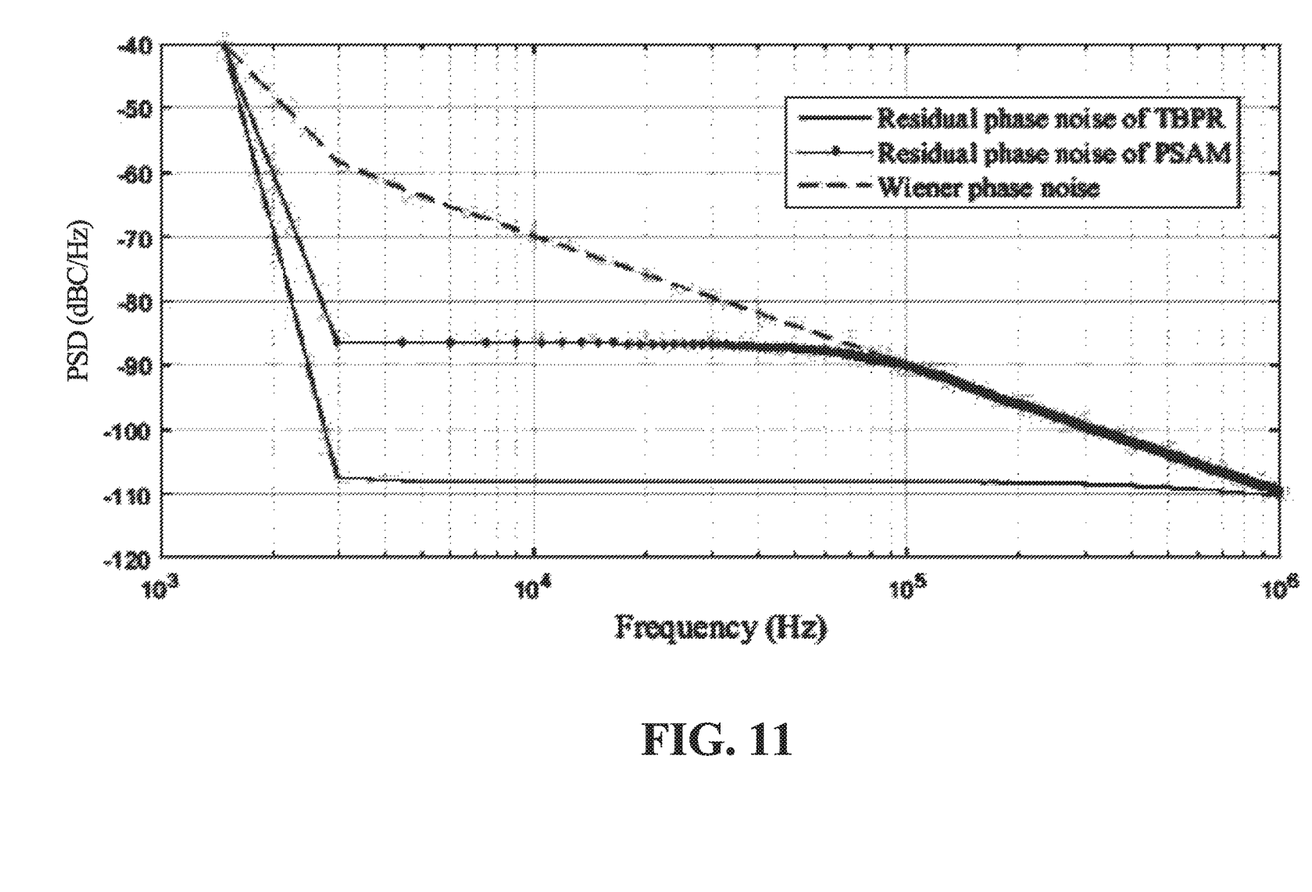
FIG. 11 is a plot illustrating Power Spectrum Density (PSD) of residual phase noise after pilot symbol assisted and trellis-based phase noise estimation and cancellation.

As mentioned earlier, even with large enough trellis phase span and fine enough phase resolution, there may be some residual phase noise after pilot symbol assisted and trellis-based phase noise estimation and cancellation. For instance, MATLAB simulation results show that root mean square estimation error of a TBPR block is 0.4 degrees for 4K-QAM at SNR of 44 dB and phase noise level of -91 dBC/Hz @100 KHz with bandwidth of 6.1 MHz and pilot spacing of 50 symbols. This residual phase noise can better be illustrated in the frequency domain. FIG. 11 shows Power Spectrum Density (PSD) of residual phase noise after pilot symbol assisted and trellis-based phase noise estimation and cancellation. As shown in FIG. 11, the proposed trellis-based phase noise estimation and cancellation with pilot symbol assisted phase noise estimation and cancellation significantly decreases the level of phase noise to about −108 dBC/Hz.

Table II below shows BER performance on an FPGA run under different scenarios, with four QAM modulations: 256 QAM, 1K-QAM, 2K-QAM, and 4k-QAM. According to Eq. 6, phase noise is more severe at lower bandwidths. In particular, with reference to Eq. 6 $\gamma^2 = \sigma^2 T$. The bandwidth or baud rate is 1/T. A lower baud rate corresponds to a larger T, which in turn corresponds to a larger value of $\gamma^2$. A larger value of $\gamma^2$ means that variance of phase from one symbol to the next is larger. Therefore, the same absolute phase noise $\sigma^2$ causes more severe degradation to the received symbol if the symbol duration (T) is longer, or in other words phase noise is more severe at lower bandwidth.

Here, performance is investigated under a challenging phase noise scenario, where channel bandwidth is BW=6.1 MHz. For all scenarios, pilot spacing is 50 symbols, which represents only two percent overhead. Pilot symbols are Quadrature Phase Shift Keying (QPSK) symbols, with an average energy equal to maximum energy of data symbols. For each scenario, SNR and phase noise level (in the typical phase noise range of a CMOS based VCO) are set, for zero BER performance for a run of $1e^{12}$ symbols during performance evaluation.

TABLE II

BER Performance on FPGA

| QAM order | SNR | Test run duration | Phase noise level @ 100 KHz | Zero BER |
|---|---|---|---|---|
| 256 | 29 | $2.4e^{12}$ symbols | −82 dBC/Hz | Success |
| 1024 | 35 | $2e^{12}$ symbols | −85 dBC/Hz | Success |
| 2048 | 38 | $3.2e^{12}$ symbols | −88 dBC/Hz | Success |
| 4096 | 44 | $2.5e^{12}$ symbols | −91 dBC/Hz | Success |

Simulation results emphasize that the simulated approach is able to provide zero BER performance at about 3 dB more SNR compared to the expected SNR of residual BER in an equivalent channel with no phase noise. This performance introduces extremely high QAM levels into practice in spite of severe phase noise limitations.

From a complexity perspective, a whole platform design (including symbol mapper, Box-Muller Gaussian white noise generator, Wiener phase noise generator, channel, phase noise estimation and cancellation as disclosed herein, slicers and BER histogram counters) was implemented inside a Xilinx VC707 board. Table III below shows a Vivado post-implementation resource utilization report.

TABLE III

VIVADO POST-IMPLEMENTATION REPORT

| Resource | Available | Utilization |
|---|---|---|
| FF | 607200 | 21154 |
| LUT | 303600 | 236073 |
| Memory LUT | 130800 | 6229 |
| I/O | 700 | 5 |
| BRAM | 1030 | 256 |
| DSP48 | 2800 | 1297 |
| BUFG | 32 | 7 |
| MMCM | 14 | 2 |
| GT | 35 | 1 |

The common assumptions, simulation conditions, and results described in this section are for illustrative purposes only. Different simulation and operating conditions are possible, and similar or different results could be observed under different assumptions or conditions.

5. Conclusion

The previous description of some embodiments is provided to enable any person skilled in the art to make or use an apparatus, method, or processor readable medium according to the present disclosure. Various modifications to these embodiments will be readily apparent to those skilled in the art, and the generic principles of the methods and devices described herein may be applied to other embodiments. Thus, the present disclosure is not intended to be limited to the embodiments shown herein but is to be accorded the widest scope consistent with the principles and novel features disclosed herein.

The contents of the drawings are intended solely for illustrative purposes, and the present invention is in no way limited to the particular example embodiments explicitly shown in the drawings and described herein.

For example, although described primarily in the context of methods and systems, other implementations are also contemplated, as instructions stored on a non-transitory processor-readable medium.

We claim:

1. A method comprising:
   receiving a communication signal comprising a symbol;
   performing single-pass trellis-based estimation of phase noise affecting the symbol, based on a trellis comprising nodes that are representatives of estimated phase noise affecting the symbol; and
   cancelling the estimated phase noise from the symbol.

2. The method of claim 1, wherein the communication signal comprises a symbol stream that includes pilot symbols interleaved with communication symbols including the symbol, the pilot symbols comprising a first pilot symbol that precedes the symbol in the symbol stream and a second pilot symbol that follows the symbol in the symbol stream.

3. The method of claim 2, further comprising:
   calculating a first pilot-assisted phase noise estimate based on the first pilot symbol and a second pilot-assisted phase noise estimate based on the second pilot symbol;
   performing an interpolation between at least the first and second pilot-assisted phase noise estimates to calculate an interpolated phase noise estimate for the symbol;
   cancelling the interpolated phase noise estimate from the symbol; and
   providing the symbol, with the interpolated phase noise estimate cancelled, as an input symbol for the trellis-based phase noise estimation.

4. The method of claim 3, wherein the interpolation is a linear interpolation or an interpolation based on more than two pilot-assisted phase noise estimates.

5. The method of claim 1, wherein the trellis-based estimation comprises one of: Bahl-Cocke-Jelinek-Raviv (BCJR)-based estimation and Viterbi-based estimation.

6. The method of claim 2, wherein the trellis comprises a forward direction trellis and a reverse direction trellis, and wherein the trellis-based estimation comprises:
   forming the forward direction trellis in a forward direction from the first pilot symbol;
   forming the reverse direction trellis in a reverse direction from the second pilot symbol; and
   determining the estimated phase noise based on probabilities associated with the forward direction trellis and the reverse direction trellis.

7. The method of claim 6, wherein the determining comprises determining the estimated phase noise based on one of: a sum of probabilities associated with the forward direction trellis and the reverse direction trellis, and a weighted sum of probabilities associated with the forward direction trellis and the reverse direction trellis.

8. The method of claim 1, wherein the symbol is a Quadrature Amplitude Modulation (QAM) symbol.

9. The method of claim 8, wherein the symbol is a 1k or higher order QAM symbol.

10. A non-transitory processor-readable medium storing instructions which, when executed by one or more processors, cause the one or more processors to perform a method comprising:
receiving a communication signal comprising a symbol;
performing single-pass trellis-based estimation of phase noise affecting the symbol, based on a trellis comprising nodes that are representatives of estimated phase noise affecting the symbol; and
cancelling the estimated phase noise from the symbol.

11. An apparatus comprising:
a receiver to receive a communication signal comprising a symbol;
a trellis-based phase noise estimator, coupled to the receiver, to perform single-pass trellis-based estimation of phase noise affecting the symbol, based on a trellis comprising nodes that are representatives of estimated phase noise affecting the symbol; and
a phase noise canceller, coupled to the trellis-based phase noise estimator, to cancel the estimated phase noise from the symbol.

12. The apparatus of claim 11, wherein the communication signal comprises a symbol stream that includes pilot symbols interleaved with communication symbols including the symbol, the pilot symbols comprising a first pilot symbol that precedes the symbol in the symbol stream and a second pilot symbol that follows the symbol in the symbol stream.

13. The apparatus of claim 12, further comprising:
a pilot symbol assisted module, coupled to the trellis-based phase noise estimator, to calculate a first pilot-assisted phase noise estimate based on the first pilot symbol and a second pilot-assisted phase noise estimate based on the second pilot symbol; to perform an interpolation between at least the first and second pilot-assisted phase noise estimates to calculate an interpolated phase noise estimate for the symbol; to cancel the interpolated phase noise estimate from the symbol; and to provide the symbol, with the interpolated phase noise estimate cancelled, as an input symbol for the trellis-based phase noise estimator.

14. The apparatus of claim 13, wherein the pilot symbol assisted module is configured to perform the interpolation as a linear interpolation or an interpolation based on more than two pilot-assisted phase noise estimates.

15. The apparatus of claim 11, wherein the trellis-based phase noise estimator is configured to perform the trellis-based estimation as one of: Bahl-Cocke-Jelinek-Raviv (BCJR)-based estimation and Viterbi-based estimation.

16. The apparatus of claim 12, wherein the trellis comprises a forward direction trellis and a reverse direction trellis, and wherein the trellis-based phase noise estimator is configured to form the forward direction trellis in a forward direction from the first pilot symbol; to form the reverse direction trellis in a reverse direction from the second pilot symbol; and to determine the estimated phase noise based on probabilities associated with the forward direction trellis and the reverse direction trellis in a single pass of the trellis to estimate the phase noise.

17. The apparatus of claim 16, wherein the trellis-based phase noise estimator is configured to determine the estimated phase noise based on one of: a sum of probabilities associated with the forward direction trellis and the reverse direction trellis, and a weighted sum of probabilities associated with the forward direction trellis and the reverse direction trellis.

18. The apparatus of claim 11, wherein the symbol is a Quadrature Amplitude Modulation (QAM) symbol.

19. The apparatus of claim 18, wherein the symbol is a 1k or higher order QAM symbol.

20. A communication device comprising:
the apparatus of claim 11; and
a symbol demodulator coupled to the phase noise canceller.

21. The communication device of claim 20, further comprising:
a symbol modulator; and
a transmitter coupled to the symbol modulator.

22. The communication device of claim 21, wherein the receiver and the transmitter are implemented in a transceiver.

23. An apparatus comprising:
a receiver to receive communication symbols that include symbols; and
a processor, coupled to the receiver, configured to perform a method comprising:
performing single-pass trellis-based estimation of phase noise affecting a received symbol, based on a trellis comprising nodes that are representatives of estimated phase noise affecting the received symbol; and
cancelling the estimated phase noise from the received symbol.

* * * * *